US007006106B2

(12) United States Patent
Schimmel

(10) Patent No.: US 7,006,106 B2
(45) Date of Patent: Feb. 28, 2006

(54) REAL TIME CONTOUR LINE GENERATION

(75) Inventor: Craig L. Schimmel, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/797,369

(22) Filed: Mar. 9, 2004

(65) Prior Publication Data

US 2005/0200633 A1 Sep. 15, 2005

(51) Int. Cl.
*G09G 5/00* (2006.01)

(52) U.S. Cl. ............... 345/606; 345/611; 345/612; 345/610

(58) Field of Classification Search ............ 345/606, 345/611, 612, 610
See application file for complete search history.

(56) References Cited

U.S. PATENT DOCUMENTS

| 4,823,287 | A | 4/1989 | Thompson |
| 5,140,532 | A | * 8/1992 | Beckwith et al. ............ 358/1.1 |
| 5,519,821 | A | 5/1996 | Schauer et al. |
| 6,026,345 | A | * 2/2000 | Shah et al. ............... 701/117 |
| 6,173,067 | B1 | * 1/2001 | Payton et al. ............. 382/106 |
| 6,177,943 | B1 | * 1/2001 | Margolin ................. 345/419 |
| 6,236,753 | B1 | 5/2001 | Inamoto |
| 6,272,448 | B1 | * 8/2001 | Ishii ...................... 703/2 |
| 6,320,984 | B1 | 11/2001 | Shigeta |
| 6,774,932 | B1 | * 8/2004 | Ewing et al. ............ 348/157 |

* cited by examiner

*Primary Examiner*—Matthew C. Bella
*Assistant Examiner*—Mike Rahmjoo
(74) *Attorney, Agent, or Firm*—Kurt Luther; Dennis F. Armijo

(57) ABSTRACT

The generation of contour plot images from elevation data in real time for use in a digital moving map. The contour line interval is dynamically selectable. The elevation data is scanned in 2 dimensions simultaneously, but in a single pass. As the elevation data is scanned for the given contour line interval, a history is maintained of the contour line elevation state in both dimensions. At any point, only comparisons against the two historical values are required to determine if a point on a contour line exists.

18 Claims, 4 Drawing Sheets

REAL TIME CONTOUR LINE GENERATION

BACKGROUND OF THE INVENTION

1. Field of the Invention (Technical Field)

The invention relates to computer graphics and more particularly to computer graphics as utilized in digital map systems in aircraft avionics, consumer mapping devices or the like.

2. Background Art

The ability to display a dynamic 2 dimensional contour line as part of a real time map display system requires the ability to generate the image from a set of grided elevation data points. The present invention provides real time generation of the contour line image without requiring either preprocessed contour line images or specific electronic hardware as the prior art requires. This would provide the necessary performance to display the digital map contour lines in real time at a lower cost and in a smaller form factor.

One prior art device is disclosed in U.S. Pat. No. 4,823,287 entitled "Digital Contour Line Generator". This device is an aircraft digital map systems that uses specific hardware to process the terrain information and requires specific hardware components. This limits the range of platforms on which the solution can be utilized, as not all are suitable for the addition of a hardware-based solution. Additionally, the cost of adding hardware either in new design or retrofit is more expensive than a solution, which can be implemented as a software only solution. Other prior art devices pre-generate the images and load them into mass storage rather than generating them on the fly. The primary disadvantage of pre-generating by any process is that it limits the geographic area which can be displayed. Furthermore, it does not allow the dynamic modification of the contour line interval, and requires mission planning or similar devices to generate and load the contour plot images into the digital map system In addition to the prior art apparatuses described above, the "marching squares" algorithm is a common knowledge algorithm in the field of computer graphics, which can be used to generate contour line images. The existing art marching squares algorithm generates contour lines by evaluating each set of 4 data points against a contour elvation value. As shown in FIG. 1, data from the input N×M matrix 124 is processed in sets of four data points 146. For each set of 4 data points, each point is determined to be inside or outside the contour line 138, where inside and outside is determined by comparing each scalar data point value with the contour elevation value. The combination of inside and outside points is then encoded such that the encoding selects one of the 16 possible combinations 130 that a contour line can cross a set of 4 data points 146.

Using the selected intersection pattern 130, the intersection points 126 and 128 are calculated via linear interpolation. The intersection points 126 and 128 are then used as endpoints 140 and 144 of a line segment 142 drawn on the output image 132. This process is repeated for each set of four neighboring data points, for each contour elevation to be displayed on the output image. However, the marching squares algorithm does not provide the performance required for real time, dynamically updated displays on state of the art digital map hardware platforms. In addition, the marching squares approach generates extraneous data by calculating more detailed information than is needed for a digital map contour image.

Therefore, the prior art approaches cannot meet both the performance requirements and the cost requirements. Approaches that meet performance require expensive additional hardware, whereas solutions, which do not require added hardware can not meet real time dynamic performance requirements. Existing methodologies for generating contour lines focus on interpolation of data for optimal image quality, but cannot adequately meet the needs for a fast moving digital map.

The present invention maintains state information as it processes data, which results in a reduced number of operations required to generate a contour line image. This allows it to operate faster, and without requiring additional hardware devices. Thus, the faster performance of the invention allows real time dynamic contour line generation on commodity hardware, at a lower cost than the prior art methods.

SUMMARY OF THE INVENTION
(DISCLOSURE OF THE INVENTION)

An apparatus and method for providing real time generation of a contour plot image of contour lines without requiring either preprocessed contour line images or specific electronic hardware is disclosed. The improved performance of the present invention provides the ability to display digital map contour lines in real time at a lower cost and in a smaller form factor than any of the prior art devices. The present invention maintains an ongoing current contour line state, which enables fast determination of contour line points without explicit comparison of multiple neighboring elevation points.

A primary object of the present invention is to generate contour plot images comprised of contour lines using gridded digital terrain data.

Another object of the present invention is to generate a contour line image at a real time performance level.

A further object of the present invention is to generate a contour line image using general-purpose commodity computer hardware.

Yet another object of the present invention is to generate a contour line image that can be integrated with a moving digital map system.

An advantage of the invention is that it requires few system resources, thus it does not require specialized computer hardware to operate effectively.

Another advantage of the invention is that it allows for dynamic updating of the contour line interval.

A further advantage is that contour lines can easily be enhanced by adding a simple weighted anti-aliasing to the invention, thereby eliminating the need for separate anti-aliasing.

The invention provide an additional advantage in that the solution is a cost-effective means of adding a dynamic contour plot capability to new and existing digital map systems Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.
}

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

The present invention is a software implementation of a process that transforms input elevation data into a contour plot image, which is comprised of a set of contour lines. The contour plot can be generated from available grided elevation data or the like. The algorithm used in the process allows for real time display such as a real time digital moving map system.

Figure 1:
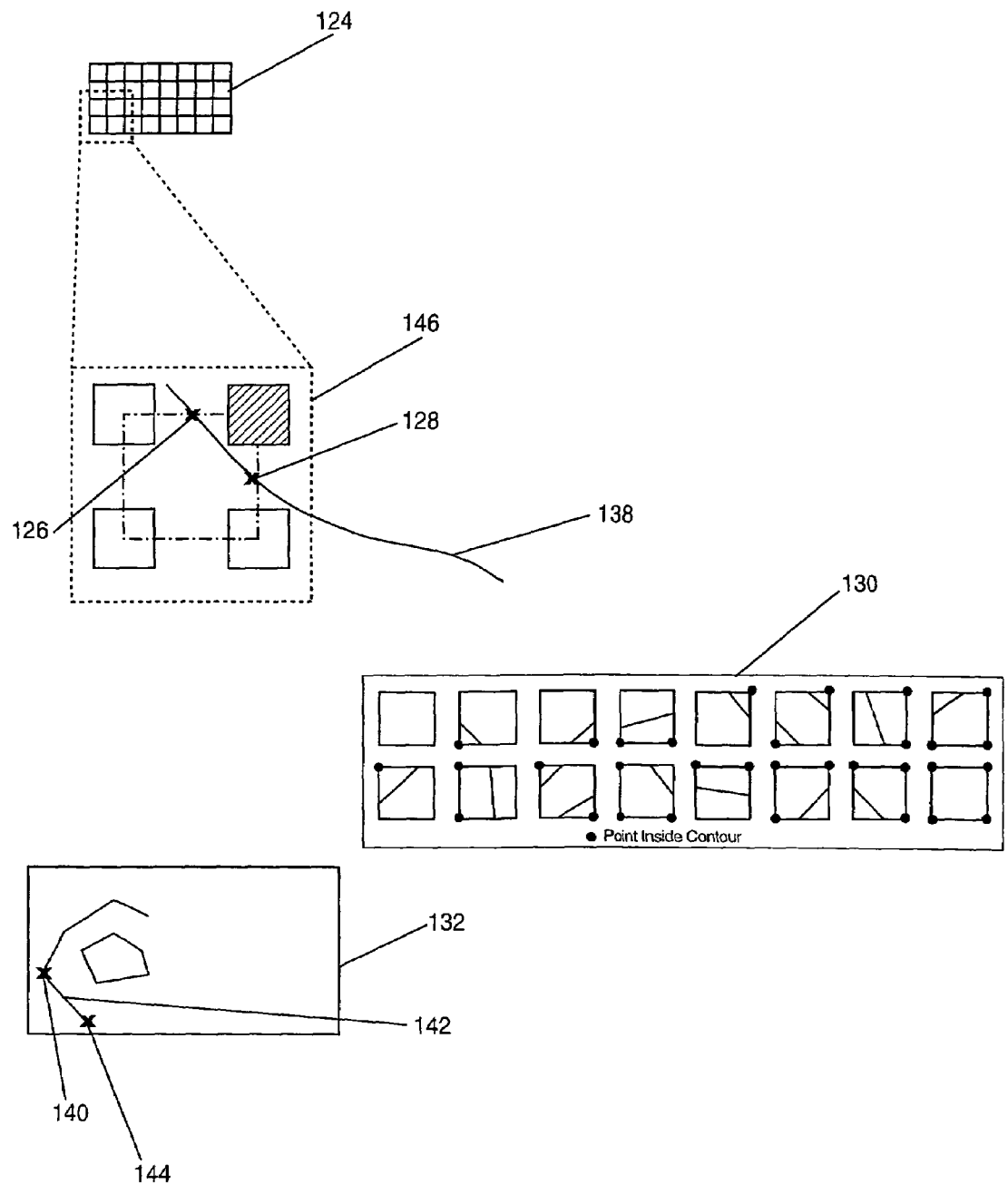
FIG. 1 shows the prior art marching squares methodology for contour imaging.
Figure 2:
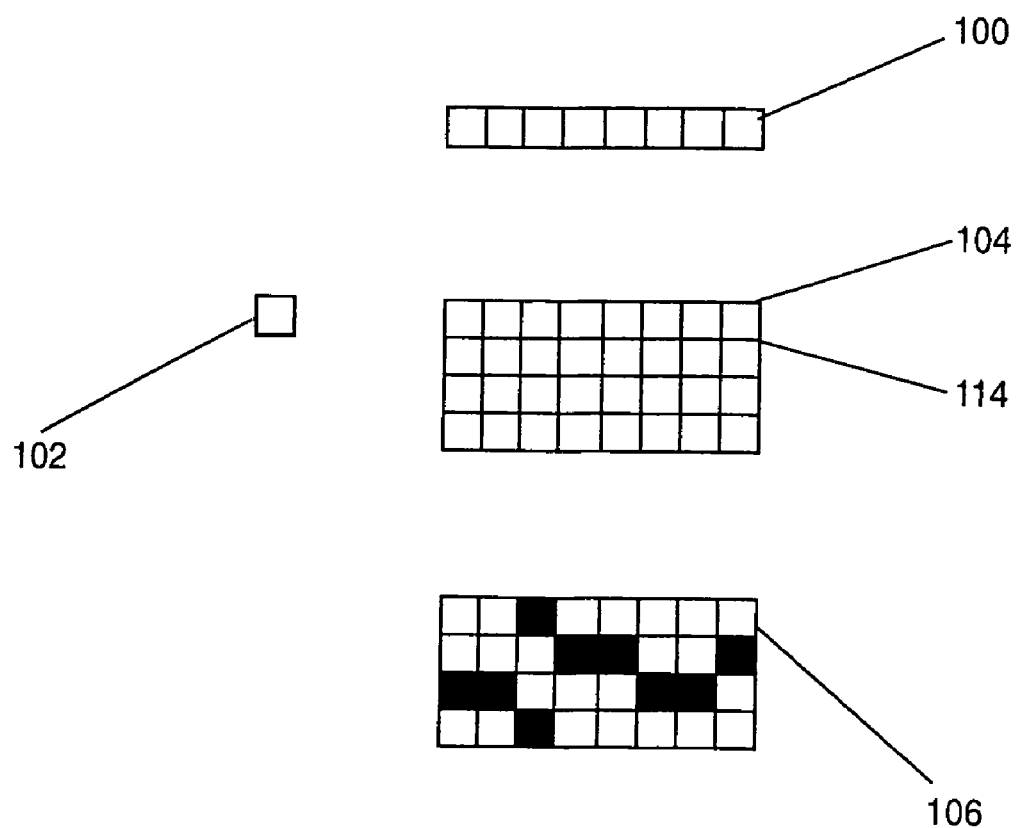
FIG. 2 depicts simultaneous row-column processing as used in the preferred embodiment.

The invention generates an contour line image from an N×M elevation data set 104 as shown in FIG. 2, where N is the number of rows and M is the number of columns in the input and output data. The data may be processed in row major or column major ordering. Row major, top to bottom ordering is used for the following description. The resultant image 106 contains the set of contour lines, which are multiples of the contour interval value provided to the invention. The contour interval 148 may be any value. Thus, an image representing, for example, the contours every 100 m is generated by using a contour interval value of 100 for an elevation data set in units of meters.

M+1 temporary memory storage locations are required for processing, one for each M columns 100 plus 1 for the current row 102. These are referred to as the row and column base elevation values respectively. These values maintain a current contour line state, which enables fast determination of contour line points without explicit comparison of multiple neighboring elevation points. An N×M output storage location is required to hold the resultant contour line image 106.

The base elevation values per column 100 are set to the largest contour interval multiple, which does not exceed the elevation value of the corresponding column of the first data row 114 of input data 104. The column base elevation set 100 is initialized only once, before processing of the elevation data begins. The row base elevation value 102 is set at the start of processing each row to the contour elevation closest to but not exceeding the first elevation value in the row.

Figure 3:
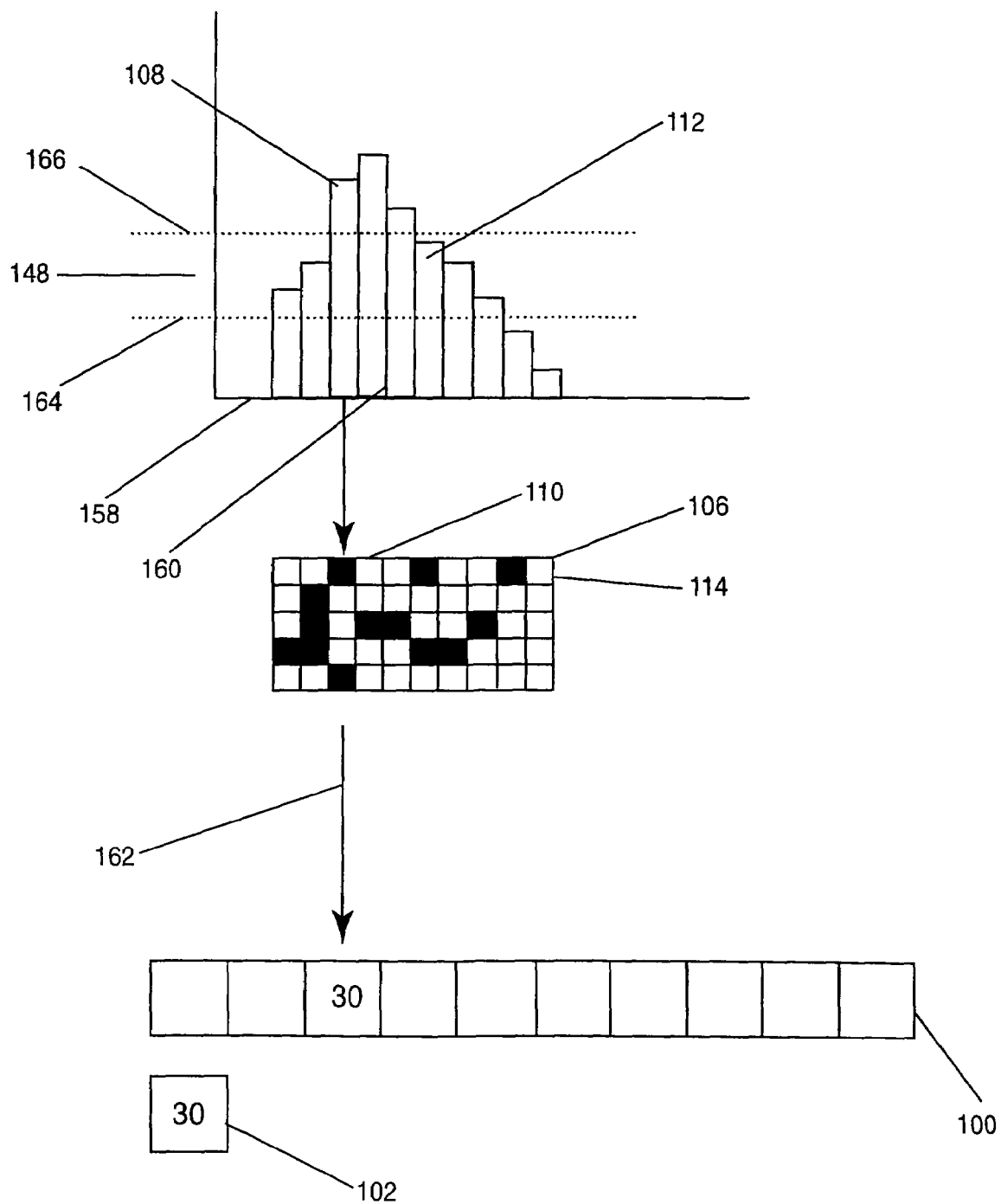
FIG. 3 shows the preferred method or processing elevation by row.

The data is scanned in row major order beginning with the first column of the first row in the elevation data set. As each data point is encountered, if the elevation data value exceeds either the row base elevation 102 or column base elevation 100 value plus the contour interval, then a contour line point has been detected. A corresponding pixel in the N×M output image memory 106 is turned on and both the row and column base elevation values are set to the contour interval multiple closest to but not to exceed the elevation data value. This can be expressed algorithmically as:

if (absolute value(elevation−row base elevation)> contour delta OR absolute value(elevation−column base elevation)> contour delta)

then set pixel in output image memory at row, column set row base elevation to (elevation/contour interval)* contour interval set column base elevation to (elevation/contour interval)*contour interval For example, as shown in FIG. 3, elevation point 108 of the input data 158 exceeds the current row base elevation 164 by a value greater than the contour interval 148. Therefore, a pixel in the output image 106 row 114 and column 110 corresponding to the elevation data point row and column 108 is given a non-blank value, i.e. the pixel is drawn. The row base elevation 102 and the column base elevation 100 are both set 162 to the highest contour interval multiple less than the elevation data point 108. This generates the points for all contour line components, which are on the rising slope of the input elevation data.

Similarly, if the input elevation value is less than either base elevation value 100 or 102, then a corresponding pixel in the N×M output 106 is turned on. Algorithmically this can be expressed as:

if (elevation−row base elevation)<0 OR elevation−column base elevation )<0) then set pixel in output image memory at row, column set row base elevation to (elevation/contour interval)* contour interval set column base elevation to (elevation/contour interval)*contour interval As an example, the elevation point 112 is below the current row base elevation value 166, therefore the corresponding pixel memory 106 is set to an on state, and the row and column base elevation values are set to the largest contour interval multiple which does not exceed the elevation data value. This generates the points for all contour line components, which are on the declining slope of the elevation data.

By maintaining the two dimensional base elevation values, the row base elevation 102 and the column base elevation set 100, the present invention eliminates the need to sample multiple neighboring data points as is performed by all present state of the art methods. The two base elevation elements combine to maintain a continuously updated state of the elevation data scan. This allows the invention embodied as software on a general purpose processor to provide real time dynamic performance while only requiring M+1 memory locations. Thus, the present invention may be utilized in any form of digital map system, which contains elevation data and M+1 available temporary storage locations. The present invention provides performance on a 366 Mhz PowerPC processor to support a 20 Hz update rate using a 1024×1024 elevation data set.

The present invention is most preferably embodied as software executing on a general purpose processor. This embodiment provides the advantage of a cost effective real time contour line solution. It is also an advantage that it can be ported to a variety of digital map systems in an easier fashion than a solution requiring a specific hardware component would. Another advantage of the invention is that it can be embodied as firmware or hardware with associated higher performance, providing flexibility. The method of the invention provides further advantage in that it generates closed loop contour lines, thereby providing an accurate contour line representation.

Figure 4:
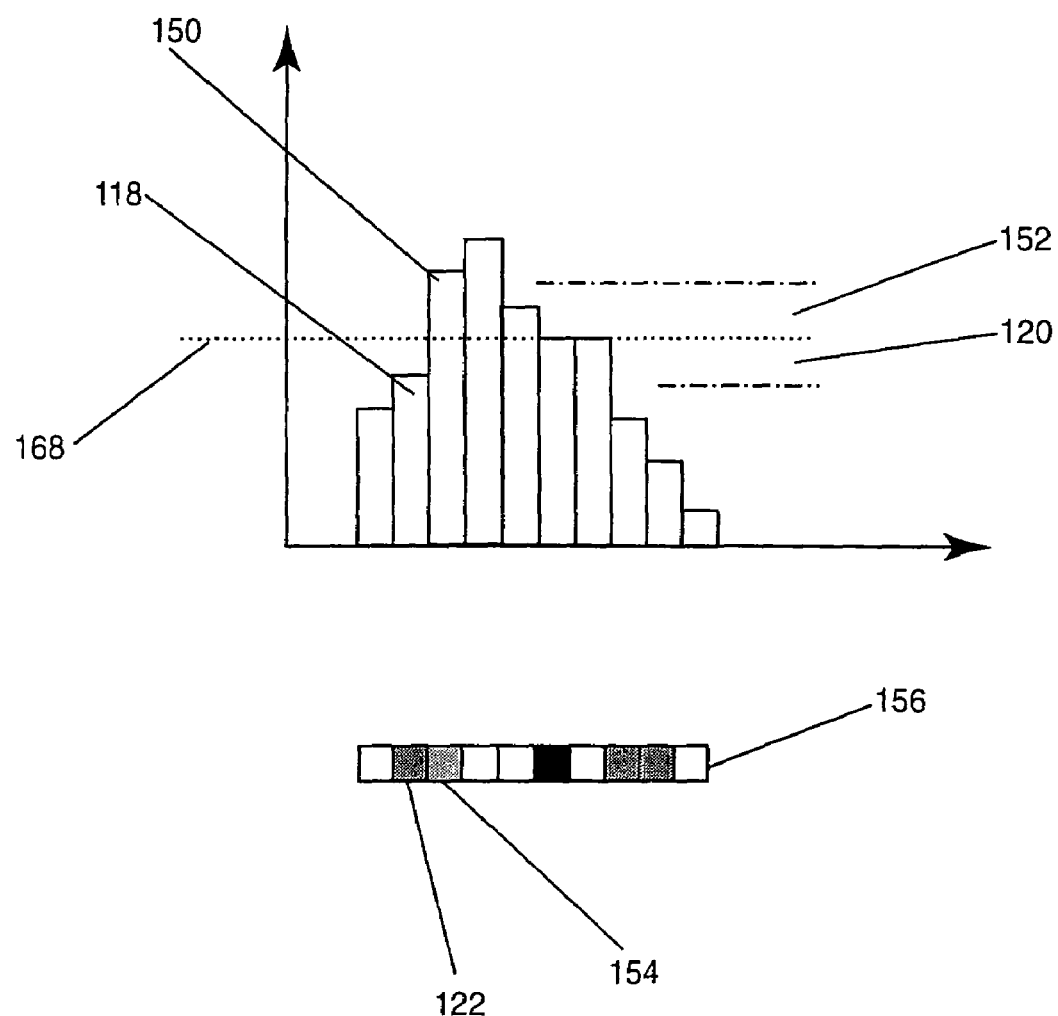
FIG. 4 shows the preferred method of contour anti-aliasing.

The invention can be modified to provide fast anti-aliasing of the contour lines, as shown in FIG. 4. Anti-aliasing smoothes the appearance of lines, removing the jagged appearance that can occur in computer generated images. When a contour line crossing is detected, the distances 120 and 152 from the pair of elevation data points 118 and 150 to the contour line elevation 168 are used as weights 122 and 154 for the pixel intensities. That is, given two data points A 118 and B 150, the weighting 120 and 152 for each output pixel 122 and 154 are given as:

Distance=Elevation_B−Elevation_A

Weight_A=(Contour Line Elevation−Elevation_A)/ Distance

Weight_B=(Elevation_B−Contour Line Elevation)/ Distance

The invention may be expanded to operate on a 3-dimensional input data set. Given an N×M×Z data set, it would produce a N×M×Z output representing the contour shape in 3-dimensions. This modification would require N+M+1 memory locations for maintaining the historical elevation values. The data would be scanned by row, column and depth in the same manner as for 2 dimensions. For each data point, comparisons with the 3 base elevation values would be performed to determine contour line points. This modification would result in degraded performance in real time systems. Such a modification of the invention would be useful to display seismic or atmospheric data.

The primary use of the invention is for generating contour lines for digital map systems. Given that the contour lines represent the slope, or steepness of the input data set, the invention can be further utilized to generate slope images of any N×M data set. For instance, the invention can be used to generate contour images of business data such as income, revenue, or others arranged in a 2 dimensional format. The contour image generated by the invention represents the rate of change in the data set values. Thus the invention could be used for real time display of business financial information.

The invention requires that sufficient memory locations to store the N×M output image and M+1 temporary memory locations are available. The real time performance of the invention is dependent on the particular physical processor being used. It is suitable for real time performance on any state of the art processor used in digital map systems.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A method of generating contour lines from elevation data, the method comprising the steps of:
    a) selecting a first data point from the elevation data;
    b) setting row and column data to an initial contour value, the row and column data comprising a first state;
    c) comparing a second data point with the first state for determining an existence of a contour line depending on a result from the step of comparing;
    d) updating the first state to a next state, wherein the next state comprises a next row and column data, if the contour line exists;
    e) creating a portion of a contour line image, if the contour line exists;
    f) proceeding to a next data point; and
    g) repeating steps b) through f) for a next column or row.

2. The method of claim 1 wherein the step of proceeding comprises proceeding in a predetermined direction.

3. The invention of claim 2 wherein the step of proceeding in a predetermined direction comprises proceeding in predetermined row and column directions.

4. The method of claim 1 further comprising the step of selecting a contour line interval.

5. The method of claim 1 further comprising anti-aliasing the contour line image.

6. The method of claim 1 wherein the step of updating comprises determining if an elevation point row and column data exceeds a current row or column base elevation by a value greater than a contour interval.

7. The method of claim 1 wherein the step of updating comprises storing the next state in a memory.

8. The method of claim 7 wherein the step of storing comprises storing the row and column base elevation.

9. The method of claim 1 wherein the step of creating comprises drawing the portion of the contour line image.

10. The method of claim 9 wherein the step of drawing comprises displaying the portion of the contour line image.

11. The method of claim 1 wherein the state of creating and the step of repeating comprises creating an entire contour line image.

12. A method of transforming input elevation data into a real-time contour plot image, the method comprising the steps of:
    a) selecting an ordering sequence;
    b) selecting a contour line interval;
    c) determining initial row and column base elevation values;
    d) selecting a first data point;
    e) determining whether a contour line point has been detected by comparing the row base elevation value or column base elevation value plus the contour interval to the elevation data;
    f) drawing a portion of a contour plot image;
    g) updating the row and column elevation values to a highest contour interval multiple less than a elevation data point;
    h) moving to a next data point; and
    i) repeating steps e) through h).

13. The method of claim 12 wherein the step of determining initial row and column base elevation values comprises selecting a contour elevation closest to but not exceeding the first elevation value in the row.

14. The method of claim 12 wherein the step of drawing and the step of repeating comprises drawing an entire contour line image.

15. An apparatus for generating contour lines from row and column data, the apparatus comprising:

a first data point from the row and column data comprising a first state;

a means for comparing a second data point with the first state for determining an existence of a contour line depending on a result from the means for comparing;

a means for updating the first state to a next state, if the contour line exists;

a means for creating a portion of a contour line image, if the contour line exists;

a next data point for comparing with the next state by the means for comparing, the next state comprising a next row and column data; and a means for drawing an entire contour line image from a plurality of portions of contour line images created by the means for creating.

16. The apparatus of claim 15 wherein said means for creating comprises a display.

17. The apparatus of claim 15 further comprising memory for storing the next state.

18. The apparatus of claim 15 further comprising a means for anti-aliasing the entire contour line image.

* * * * *